(No Model.)
E. T. THOMAS.
SEWING MACHINE SHUTTLE.
No. 287,887. Patented Nov. 6, 1883.
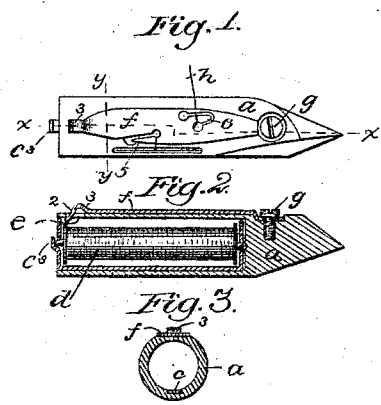
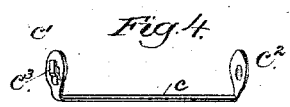
Witnesses.
John F. C. Prunkert
Fred A. Powell
Inventor:
Eddy T. Thomas
by Crosby & Gregory
attys.

UNITED STATES PATENT OFFICE.

EDDY T. THOMAS, OF NEW YORK, N. Y., ASSIGNOR TO C. W. WILLIAMS MANUFACTURING COMPANY, OF MONTREAL, CANADA.

SEWING-MACHINE SHUTTLE.

SPECIFICATION forming part of Letters Patent No. 287,887, dated November 6, 1883.

Application filed October 19, 1882. (No model.)

*To all whom it may concern:*

Be it known that I, EDDY T. THOMAS, of New York, county of New York, State of New York, have invented an Improvement in Shuttles for Sewing-Machines, of which the following description, in connection with the accompanying drawings, is a specification.

My invention in shuttles relates to improvements in means for supporting and retaining the bobbin in place in the shuttle, and to a novel construction of the tension-spring, as will be hereinafter described. The shuttle-shell, bored or chambered at its heel for the reception of the bobbin and bobbin-holder, is provided at its interior with a longitudinal groove for the reception of the bar of the bobbin-holder, the said bar connecting the two bearings or disk-like plates which receive the journals of the bobbin. The bar of the bobbin-holder, entering the groove at the interior of the shuttle-shell, prevents the holder from being rotated. The tension-spring, having two prongs which constitute the fixed points over which the shuttle-thread is drawn, is provided at one end with a hook to enter a hole in the shuttle-shell, near its heel, and near the said hook, and between it and the rearmost prong of the spring, the latter is bent or crooked transversely to permit the ready introduction of the shuttle-thread under it, so that the said thread, as it is drawn forward, will readily cross the rearmost prong, and at its other end the said spring has a hole to receive the tension-regulating screw.

Figure 1 represents in top view a shuttle embodying my present improvements; Fig. 2, a longitudinal section thereof on the dotted line $x\,x$, Fig. 1; Fig. 3, a cross-section on the line $y\,y$; and Fig. 4 represents the bobbin-holder removed.

The shuttle-shell $a$, open at its heel, as usual, is grooved longitudinally at its inner side, as shown in Fig. 3, to receive the bar $c$ of the bobbin-holder, composed of the said bar, made narrow, as described, and the two bearings or disks $c'\,c^2$, having central holes for the reception of the journals or projecting end pieces of the bobbin $d$, the said bearings preventing the heads of the bobbin from resting against the shuttle-shell. The bar $c$, placed in the groove in the shuttle-shell, prevents the rotation of the bobbin-holder. The disk $c'$ has a projection, $c^3$, by which to enable the holder to be readily engaged and withdrawn. The shuttle-shell, near its heel, has an opening, $e$, to receive the hooked end 2 of the tension-spring $f$, which, near the said hook, is provided with a transverse crook or bend, 3, to form between the said spring and shuttle-shell a free open space for the easy passage of the shuttle-thread under the said tension-spring. The tension-spring is provided with two prongs, 5 6, to retain the shuttle-thread $h$ and direct its travel under the tension-spring, and at its end nearest the point of the shuttle the said spring is provided with a depressed part having a hole for the tension-regulating screw $g$, which is entered into a threaded part of the shuttle-shell. The prong 5 of the tension-spring points toward the hooked end 2, and the bend 3 is made between the said prong and hooked end, so that the shuttle-thread, led out through the shuttle-shell and threaded through the bend 3, may by a lateral movement be carried over the said prong 5. The free end of the thread is drawn yet farther under the tension-spring until it passes the point of the prong 6, when it is drawn under the spring in the opposite direction, and as the point of the prong 6 enters a hole or depression in the shuttle-shell the thread is carried up upon the prong 6.

By my construction and arrangement of tension-spring the thread is very readily and in a most simple manner introduced thereunder. The proper degree of tension may be very easily given, and the thread is kept taut about the shuttle. These desirable qualities are due in a large measure to my introduction into a shuttle tension-spring of the threading-eye 3 at the heel end of the shuttle and the provision of the rearwardly-pointing prong 5 at that side of the shuttle next the thread-slot in the shuttle. The thread pays out freely, regularly, and yet properly tensioned with my spring.

I claim—

1. The shuttle shell or body provided at its interior with a longitudinal groove, combined with the bobbin-holder composed of the bar and its bearings to hold the journals of the bobbin, and a projection by which the holder may be readily engaged and withdrawn, substantially as described.

2. The tension-spring $f$, provided with the hooked end 2, having the bend or crook 3 at the heel end of the shuttle, to form an eye for threading the thread under the spring, and provided with the lateral prong 5 next the thread-slot in the shell and pointing toward the heel of the shuttle, and the oppositely-pointing prong 6, as described, combined with the shuttle-shell having the opening $e$, to receive the hooked end 2 of the tension-spring, and the screw $g$, to fasten such spring to the shuttle-shell, substantially as shown and specified.

In testimony whereof I have signed my name to this specification in the presence of two subscribing witnesses.

EDDY T. THOMAS.

Witnesses:
G. W. GREGORY,
B. J. NOYES.